Patented Nov. 13, 1951

2,574,533

UNITED STATES PATENT OFFICE 2,574,533

DIALYZING MEMBRANE AND PROCESS OF DIALYSIS

Ralph T. K. Cornwell, Rosemont, Edward J. Dunn, Drexel Hill, and Alfred W. Hunter, Chester, Pa., assignors to American Viscose Corporation, Wilmington, Del., a corporation of Delaware No Drawing. Application May 24, 1949, Serial No. 95,148

3 Claims. (Cl. 210—8.5)

This invention relates to a dialyzing membrane containing therein a decolorizing agent so that a colorless or practically colorless diffusate would be obtained on the dialysis of certain colored solutions.

The primary object of the invention is to provide a membrane through which the diffusion of undesirable colored substances is prevented without affecting the diffusion of other materials. This is accomplished by providing a dialyzing membrane of a non-fibrous hydrophilic material within the body of which there is included a decolorizing agent. Other objects and advantages of the invention will be apparent from the description thereof.

The membrane of the present invention may be made from any film-forming water-swelling (that is, hydrophilic) material, such as cellulose hydrate, alkali-soluble cellulose ethers, hydrophilic cellulose esters, hydrophilic mixed ester-ethers of cellulose, gelatin, casein, de-acetylated chitin, water-swelling resins and the like. The hydrophilic cellulose ethers may comprise the alkyl ethers, the hydroxy-alkyl ethers, the carboxy-alkyl ethers, and the mixed ethers, such as alkyl hydroxy-alkyl cellulose ethers. The cellulose esters which may be used include water-swelling compounds such as low-nitrated cellulose nitrate, low esterified cellulose acetate and cellulose formate, and the like. Cellulose hydrate may be regenerated from viscose or cuprammonium solutions of cellulose or from solutions of cellulose in inorganic or organic solvents. Among the water-swelling resins which may be used are the water-swelling polymers of acrylic acid, water-swelling methyl-methacrylates, the polyvinyl alcohol resins, and the like. In the preferred embodiment there is employed a membrane formed of denitrated nitro-cellulose but precautions against fire must be taken in handling the membrane if dried before denitration.

The membranes of these materials are made by forming these materials in conventional manner into the form of a foil, film, sheet, bag, or tube. Prior to the conversion of these materials into whatever form is desired, there is incorporated within them from about ½ to 35% of a finely divided decolorizing agent. Activated carbon or other decolorizing material may be employed for this purpose. For example, the hydrophilic material prior to formation may be dissolved or, when thermoplastic, it may be melted, and the decolorizing agent may be intimately dispersed into the body of solution or melt. The conversion of the solution or melt containing the decolorizing agent into tubes, films, or the like may be effected by conventional equipment, such as by extrusion through a long narrow slit or an annular orifice, each having the appropriate width and length to provide a sheet of the desired width and thickness or a tube of the desired diameter and thickness.

The formed material containing the decolorizing agent may be coagulated and, if desired, cured or indurated, to the final set condition in which it is still hydrophilic and permeable to particles of less than colloidal dimensions.

The hydrophilic membrane containing the decolorizing agent may be modified by precipitation of inorganic salts, such as copper ferrocyanide, within the body thereof. This may be effected in the manner disclosed in Patent 2,361,000 in which the pellicle of the material is first impregnated with a solution of copper sulfate and after rinsing with a solution of potassium ferrocyanide. If desired, each of the solutions may be applied simultaneously to different sides of the pellicle so that the copper ferrocyanide is precipitated within the body of the structure. The cellulosic pellicles, particularly those of regenerated cellulose, may be modified by the precipitation at one or both surfaces thereof or at some intermediate plane between the two surfaces of a water-insoluble polymerized organic composition such as a melamine-formaldehyde, urea-formaldehyde, or other resin. This may be effected by first impregnating one or both surfaces with a water-soluble preliminary condensate of such a resin and then polymerizing the impregnant in situ to form a water-insoluble deposit within the pellicle as described in application, Serial No. 614,030, filed September 1, 1945.

Dialysis effects a separation of materials of differing molecular size and constitution from a mixture thereof by selectively permitting diffusion of such materials as have a smaller molecular size while preventing diffusion through the dialyzing membrane of the materials of larger or colloidal molecular size. The membrane of the present invention which contains a decolorizing agent is applicable to any dialyzing process for the separation of various mixtures of substances in solution, suspension, and colloidal dispersion. The semi-permeable membranes can be used for the separation of crystalloids from colloids; for example, the separation of salts and sugars from molasses, milk, blood, latex, and the like; separation of colloids of larger molecular weights from those of smaller molecular weights such as the separation of mixtures of dextrins having different molecular weights, or the separation of impurities from vitamins, hormones, latex, milk, dextrins, and the like. Particular mention may also be made to the recovery of sugar, glycerol, lactic acid, 1,4-butanediol, 2,3-butylene glycol, citric acid, fumaric acid, tartaric acid, oxalic acid, etc., from molasses (either from cane or beet sugar) or the fermentation mashes thereof or slops obtained in fermentation processes in general or any other source. It is particularly in the recovery of diffusible materials from fermented molasses, etc. that it is desirable to prevent the diffusion of colored substances. Such "beer slops" contain dark-colored bodies which are generally referred to as caramel which are capable of diffusing through semi-permeable dialyzing membranes of regenerated cellulose. However, when dialyzing such discolored liquors through the dialyzing membrane containing activated carbon, a colorless or practically colorless diffusate is obtained. This avoids the necessity of subjecting either the material to be dialyzed or the diffusate obtained after dialysis to a separate decolorizing step which usually consists in introducing a batch of decolorizing material into a vessel containing the solution to be decolorized and subsequent filtration. It has been found that a semi-permeable dialyzing membrane containing suffused therein a decolorizing agent in effective quantities has an adequate useful life to make the present process an economic and efficient one from the commercial viewpoint. The proportion of decolorizing agent within the membrane may vary from ½% to 35%. The larger percentages tend to produce a somewhat weaker membrane but result in increased life of the membrane. When the materials to be decolorized and dialyzed simultaneously contain a relatively small proportion of discoloring bodies, membranes containing a relatively low proportion of decolorizing agent may be employed. In general, the preferred and most generally useful membranes are obtained with from 8 to 15% of decolorizing agent based on the total weight of the membrane.

*Example I*

Activated carbon (4.68 parts by weight) was mixed with 400 parts by weight of a viscose containing 7.8% cellulose and 6.6% sodium hydroxide and after thorough dispersion, the mixture was aged to a salt test (sodium chloride) of about 2.5. The viscose was formed into a film which was coagulated in a bath containing 10% ammonium sulfate in water and regenerated in a second bath containing 10% sulfuric acid and 10% sodium sulfate at 50° C. The film was washed and desulfurized in an aqueous 10% sodium sulfide bath. The resulting film contained about 13% carbon. This film was used as the dialyzing membrane for the counter-current dialysis with water of a molasses containing glycerol. The diffusate was absolutely colorless for a period of 96 hours after which it became light yellow. This yellow color did not deepen throughout the next 100 hours of operation.

*Example II*

A denitrated nitrocellulose sausage casing having a wall thickness of 0.0019 to 0.0026 inch and containing 15% of activated carbon was used for dialyzing a beet sugar molasses in counter-current relation to water. The diffusate remained colorless through a period of 150 hours of operation and became light yellow but did not darken during the next 150 hours of operation.

*Example III*

A liquor resulting from the fermentation of molasses in an alkaline medium for the production of glycerol was filtered, rendered simultaneously acid, and the alcohol and acetone were distilled off in a copper still. The residue was then concentrated to about 50% of its initial volume and then neutralized with an aqueous solution of potassium bicarbonate. The concentrated liquid was then heated to about 75° C. and passed through a dialyzer containing a plurality of membranes formed of denitrated nitrocellulose casings containing 15% of activated carbon. The diffusate remained colorless for a period of operation of over 400 hours. The diffusate was then concentrated in the customary manner and could be further purified if desired.

It is to be understood that changes and variations may be made without departing from the spirit and scope of the invention as defined in the appended claims.

We claim:

1. The method of separating materials of differing molecular size and constitution from a mixture thereof containing discoloring bodies comprising the step of dialyzing the mixture with a semi-permeable membrane comprising a pellicle of regenerated cellulose containing between about ½ and 35% by weight of finely divided activated carbon.

2. A semi-permeable membrane comprising a pellicle of regenerated cellulose containing between about ½ and 35% of a finely divided activated carbon distributed therethrough.

3. A semi-permeable membrane comprising a pellicle of regenerated cellulose containing between 8 and 15% of a finely divided activated carbon distributed therethrough.

RALPH T. K. CORNWELL.
EDWARD J. DUNN.
ALFRED W. HUNTER.

REFERENCES CITED

The following references are of record in the file of this patent:

UNITED STATES PATENTS

| Number | Name | Date |
|---|---|---|
| 1,878,237 | Hoffman et al. | Sept. 30, 1932 |
| 2,361,000 | Zender | Oct. 23, 1944 |
| 2,386,381 | Cornwell | Oct. 9, 1945 |